US012574277B2

(12) United States Patent
Gutman et al.

(10) Patent No.: US 12,574,277 B2
(45) Date of Patent: Mar. 10, 2026

(54) DYNAMIC CONTROL OF POWER AMPLIFIER BACK OFF FOR AMPLIFY AND FORWARD REPEATERS

(71) Applicant: QUALCOMM Incorporated, San Diego, CA (US)

(72) Inventors: Igor Gutman, Hod HaSharon (IL); Tao Luo, San Diego, CA (US); Yavuz Yapici, Florham Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 813 days.

(21) Appl. No.: 17/817,617

(22) Filed: Aug. 4, 2022

(65) Prior Publication Data

US 2024/0048420 A1 Feb. 8, 2024

(51) Int. Cl.
H04L 27/26 (2006.01)
H04B 7/155 (2006.01)
(52) U.S. Cl.
CPC ......... H04L 27/2614 (2013.01); H04B 7/155 (2013.01)
(58) Field of Classification Search
CPC . H04L 27/2614; H04L 27/2647; H04B 7/155; H04B 7/15528

USPC ....... 370/315; 455/13.4, 127.1–127.5, 114.3, 455/298–299, 343.1–343.6, 522, 571–574
See application file for complete search history.

(56) References Cited

U.S. PATENT DOCUMENTS

| 2010/0177832 A1* | 7/2010 | Baliga ................. H04L 27/2614 |
| | | 375/260 |
| 2013/0195221 A1* | 8/2013 | Lozhkin ............... H03F 1/3247 |
| | | 375/297 |
| 2023/0388169 A1* | 11/2023 | Cao ..................... H04L 27/2618 |

* cited by examiner

*Primary Examiner* — Michael Y Mapa
(74) *Attorney, Agent, or Firm* — Procopio, Cory, Hargreaves & Savitch LLP

(57) ABSTRACT

Method and apparatus for dynamic control of power amplifier back off for repeaters. The apparatus uses a channel model to model a first signal at a channel output. The channel model models a channel between a receiver and a transmitter. The apparatus performs a PAPR reduction on the first signal at the receiver to generate a second signal having a reduced PAPR. The apparatus inputs the second signal through an inverse channel model to generate an output signal. The apparatus outputs the output signal to the receiver, such that the PAPR of the output signal is reduced at an input of the receiver.

19 Claims, 13 Drawing Sheets

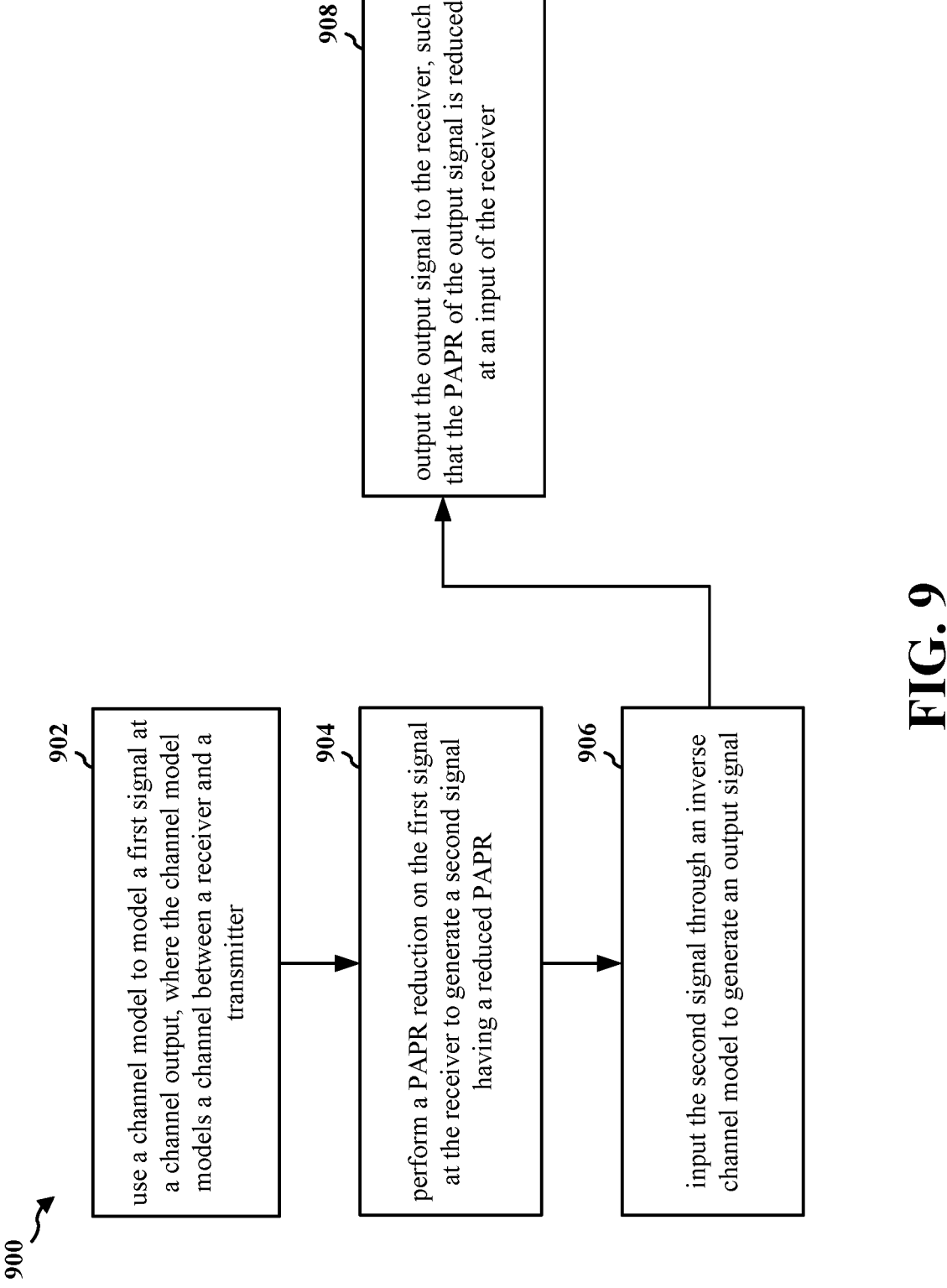

908 output the output signal to the receiver, such that the PAPR of the output signal is reduced at an input of the receiver

902 use a channel model to model a first signal at a channel output, where the channel model models a channel between a receiver and a transmitter

904 perform a PAPR reduction on the first signal at the receiver to generate a second signal having a reduced PAPR

906 input the second signal through an inverse channel model to generate an output signal

1202 receive, from a network entity, a capability request to determine whether the repeater supports a dynamic backoff signal

1204 transmit, to the network entity, a capability indication in response to receipt of the capability request

1206 receive an updated power amplifier backoff value in response to the repeater indicating support for the dynamic backoff signal

1

DYNAMIC CONTROL OF POWER AMPLIFIER BACK OFF FOR AMPLIFY AND FORWARD REPEATERS

TECHNICAL FIELD

The present disclosure relates generally to communication systems, and more particularly, to a configuration for dynamic control of power amplifier back off for repeaters.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a network entity. The device may be a processor and/or a modem at a network entity or the network entity itself. The apparatus uses a channel model to model a first signal at a channel output, where the channel model models a channel between a receiver and a transmitter. The apparatus performs a peak to average power ratio (PAPR) reduction on the first signal at the receiver to generate a second signal having a reduced PAPR. The apparatus inputs the second signal through an inverse channel model to generate an output signal. The apparatus outputs the output signal to the receiver, such that the PAPR of the output signal is reduced at an input of the receiver.

In an aspect of the disclosure, a method, a computer-readable medium, and an apparatus are provided. The apparatus may be a device at a repeater. The device may be a processor and/or a modem at a repeater or the repeater itself. The apparatus receives, from a network entity, a capability request to determine whether the repeater supports a dynamic backoff signal. The apparatus transmits, to the network entity, a capability indication in response to receipt of the capability request. The apparatus receives an updated power amplifier backoff value in response to the repeater indicating support for the dynamic backoff signal.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 9 is a flowchart of a method of wireless communication.

DETAILED DESCRIPTION

Figure 1:
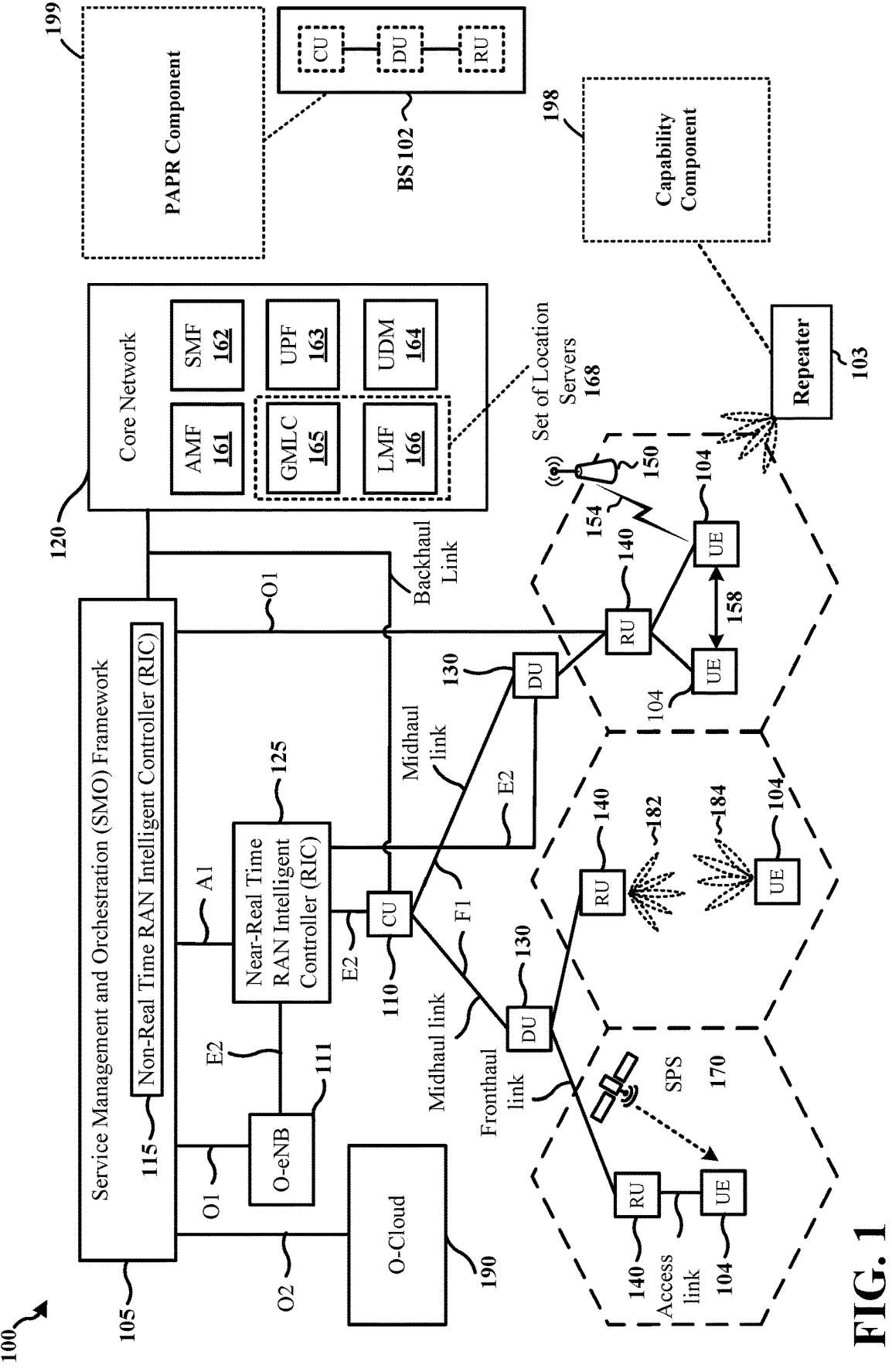
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140. In some aspects, communication may be provided between the RUs 140 and the UE 104 by a repeater 103. The repeater may be employed to extend coverage. The repeater may amplify and forward the communication from the RU 140. The repeater 103 may forward the communication from the RU 140 towards another repeater or to a UE.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2 and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 102 may comprise a PAPR component 199 configured to use a channel model to model a first signal at a channel output, where the channel model models a channel between a receiver and a transmitter; perform a PAPR reduction on the first signal at the receiver to generate a second signal having a reduced PAPR; input the second signal through an inverse channel model to generate an output signal; and output the output signal to the receiver, such that the PAPR of the output signal is reduced at an input of the receiver.

Referring again to FIG. 1, in certain aspects, the UE 104 may comprise a capability component 198 configured to receive, from a network entity, a capability request to determine whether the repeater supports a dynamic backoff signal; transmit, to the network entity, a capability indication in response to receipt of the capability request; and receive an updated power amplifier backoff value in response to the repeater indicating support for the dynamic backoff signal.

Although the following description may be focused on 5G NR, the concepts described herein may be applicable to other similar areas, such as LTE, LTE-A, CDMA, GSM, and other wireless technologies.

Figures 2A, 2B, 2C, 2D:
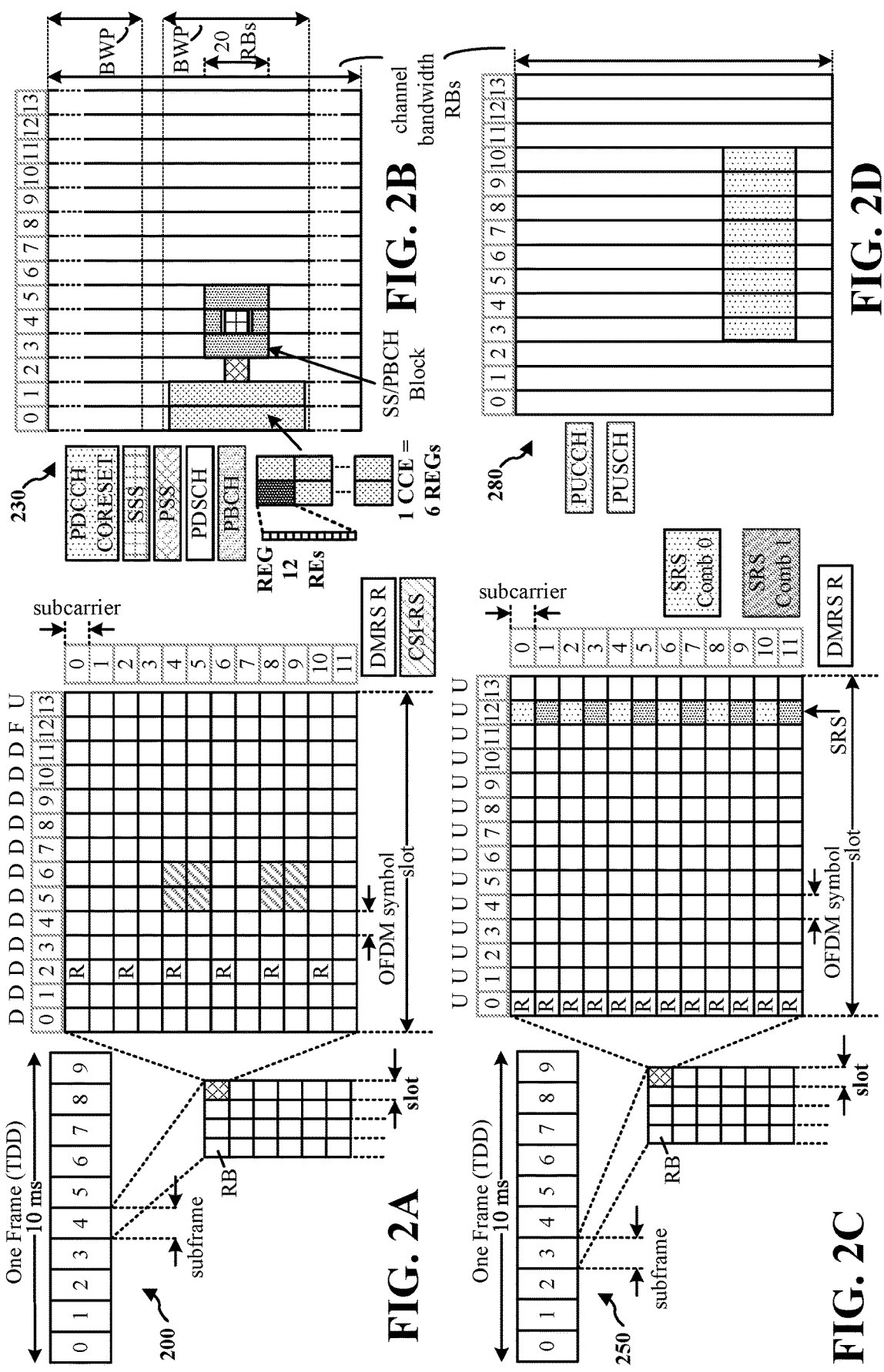
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/ SCS.

| μ | SCS<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
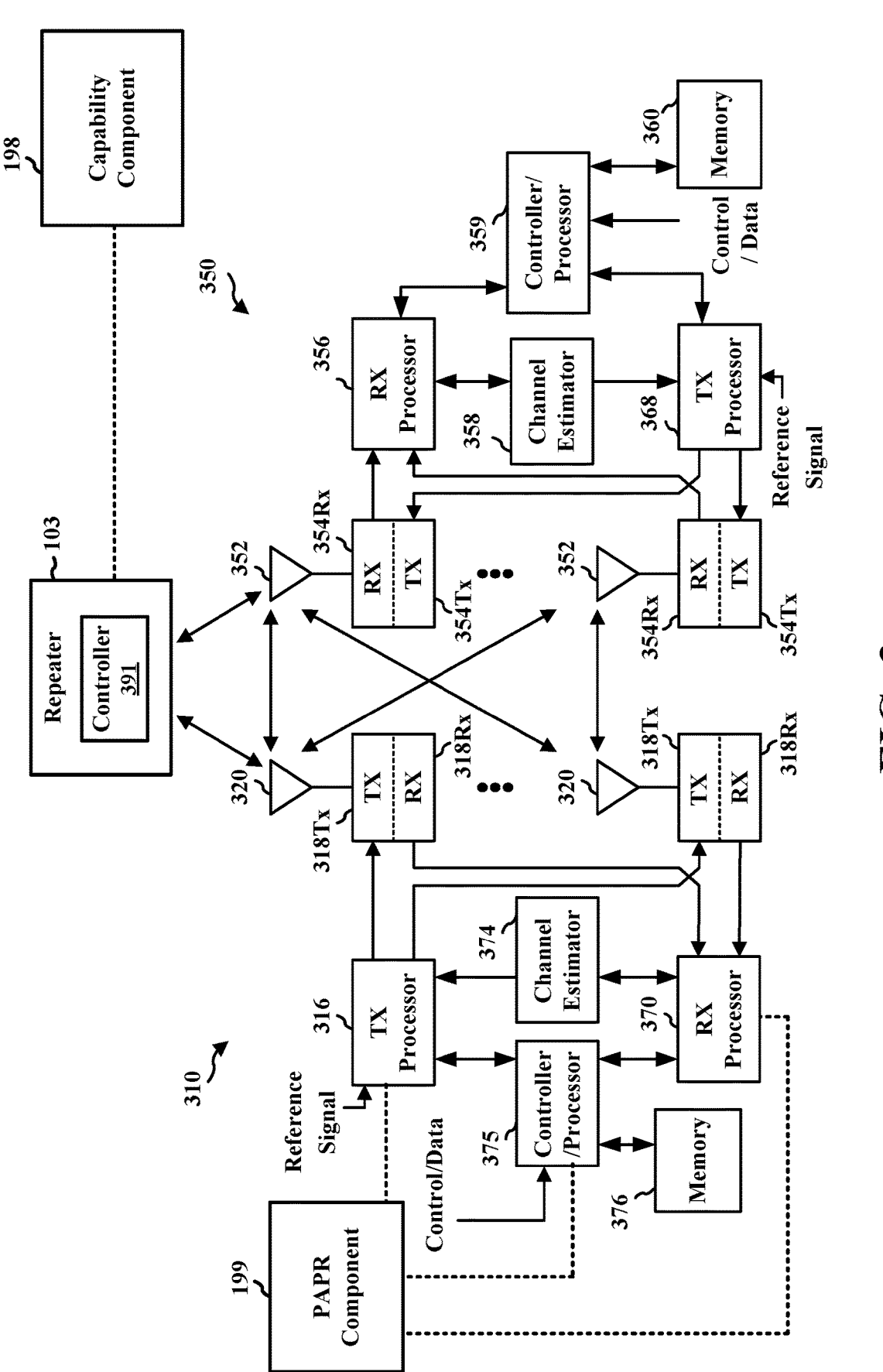
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Figure 4:
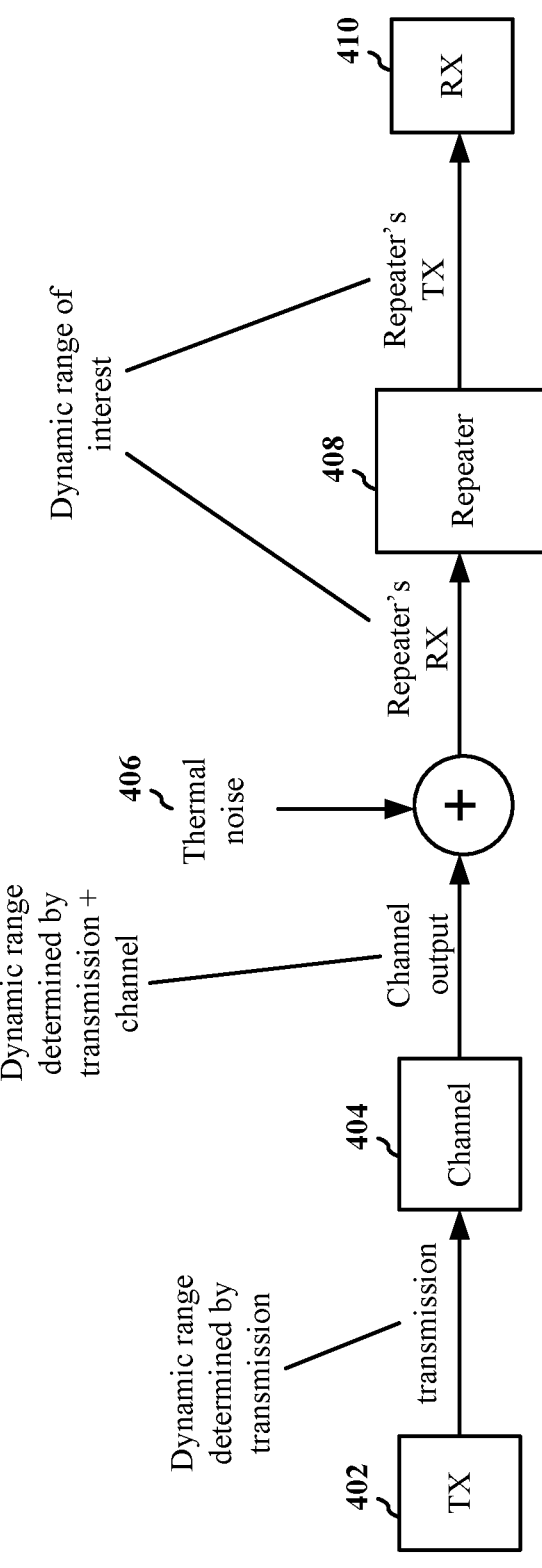
FIG. 4 is a diagram illustrating dynamic ranges of a signal transmitted to a receiver via a repeater.

In some aspects, communication may be provided between the base station and the UE by a repeater such as described in connection with any of FIG. 1 or FIGS. 4-x. The repeater may be employed to extend coverage. The repeater may amplify and forward the communication from the base station. The repeater may forward the communication from the base station towards another repeater or to a UE. The repeater 103 may be controlled by a controller 391, such as a UE.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 316, the RX processor 370, and the controller/processor 375 may be configured to perform aspects in connection with the PAPR component 199 of FIG. 1.

In wireless communications, the dynamic range of a signal may play a role in the power efficiency of a network, due in part to the efficiency optimization of the power amplifiers in the network nodes. The dynamic range may be dictated by PAPR of the signal, as the emission requirements may be violated in case of peak clipping and insufficient back off of the power amplifier. If the back off is less than PAPR, then clipping may occur, such that back off should be greater than PAPR. PAPR reduction methods may be applied on a transmitter in an effort to reduce the dynamic range of the signal. Reducing the dynamic range of the signal may allow for the signal to be less sensitive to a power amplifier response or noise at the transmitter. The transmitter consumes most of the power due to low power amplifier efficiency.

In some instances, coverage of a cell may be extended using a repeater (e.g., amplify and forward repeater). In instances where amplify and forward repeaters are used, it may be advantageous to reduce the dynamic range of the signal at the receiver of the repeater. For example, the signal at the input to a receiver of the repeater may be amplified by its transmitter. In instances where a link includes one or more repeaters, the dynamic range of the signal in the power amplifier input of the repeater may be based on the dynamic range of the received signal at the receiver of the repeater. The repeater may amply the signal as-is, and the PAPR at the receiver of the repeater may not be the same as the PAPR in the transmission from the transmitter, due in part to the over-the-air channel. For mid/high signal to noise ratio instances (e.g., typical downlink cases), the PAPR of the signal at the repeater input may be the same as its output. However, for low signal to noise ratio instances, the PAPR may be increased, since the signal may be dominated by thermal noise, which is Gaussian.

A typical signal to noise ratio of the signal at the repeater's reception may be high, such that the dynamic range of the signal at the transmitter of the repeater may be determined by the dynamic range of the receiver of the repeater. For example, with reference to diagram 400 of FIG. 4, the diagram 400 includes a transmitter 402 (e.g., base station), a channel 404, thermal noise 406 that may be introduced during transmission, a repeater 408, and a receiver 410 (e.g., UE). The dynamic range of the transmission of the transmitter 402 is determined by the transmission. The dynamic range of the channel output of the channel 404 is based on the dynamic range of the transmission and the channel 404. The dynamic range of interest is at the input of repeater 408, and at the transmission of the repeater 408. A backhaul channel is the channel 404 between the transmitter 402 and the repeater 408, and may typically have high signal to noise ratio. The channel between the repeater and the receiver 410 may be an access channel which may typically have a low signal to noise ratio. Efficiency of the power amplifier at the repeater may determine the signal to noise ratio of the access channel, while efficiency of the power amplifier may rely on the dynamic range of the signal at the input of the repeater. PAPR at the power amplifier may determine the dynamic range of the signal at the input of the repeater, such that PAPR reduction at the receiver of the repeater may be useful. Reducing the dynamic range of the signal or the PAPR of the signal at the input of the repeater may allow for an optimization of the power efficiency and improve the signal to noise ratio of the access channel.

A challenge in reducing the dynamic range of a waveform at the input of the power amplifier, in relation to the receiver, is that the signal, after the power amplifier, may experience a linear channel which may increase the dynamic range of the signal. For example, with reference to diagram 500 of FIG. 5, the diagram includes a TX generation 502, a PAPR reduction 504, a power amplifier 506, a channel 508, and a repeater receiver 510, and a respective PAPR identified between each step. From the diagram 500 of FIG. 5, PAPR(a)≥PAPR(b)≥PAPR(c), but there is no indication as to the PAPR between PAPR(c) and PAPR(d). This means that reducing the PAPR at the power amplifier 506 input may not affect the PAPR at the repeater receiver 510. For example, the following model $y_{rx}$=h*$x_{pa}$+n even if the dynamic range of the $x_{pa}$ is small, the dynamic range of h*$x_{pa}$ is different than that of $x_{pa}$ and may be very large, subject to h. Thus, if the channel model is known, then an accurate PAPR reduction may be performed to improve PAPR(d).

In some instances, the repeater may be within a set of linked repeaters. For example, with reference to diagram 600 of FIG. 6, the diagram 600 includes a TX generation 602, a PAPR reduction 604, a channel1 606, a repeater1 608, a channel2 610, a repeater2 612, and may continue to have channel 614 and a repeater 616. A reduction of the PAPR at the receiver may be performed by applying a PAPR reduction at the transmitter. The over-the-air channel may be considered, which may allow for the reduction of PAPR at the receiver of the repeater, and thereby improve the power amplifier efficiency of the transmitter of the repeater. In instances of multiple repeaters, the PAPR reduction may control the dynamic range of the signal at different locations. This may be done if the over-the-air channel between the power amplifier output of the main transmitter (e.g., 602) and repeater n 616 is known. In some instances, different key performance indicator (KPI) may be optimized, such as but not limited to power amplifier efficiency of a certain hop, or a link budges of the entire link.

Aspects presented herein provide a configuration for dynamic control of power amplifier back off for repeaters. Aspects presented herein may also provide a configuration for PAPR reduction at a receiver of a repeater. The aspects presented herein allow for a PAPR reduction method to reduce PAPR at a receiver of a repeater by applying a PAPR reduction in a transmitter's front end. The aspects presented herein allow for control of the back off of each device within a link in order to optimize KPIs of one or more devices within the link. At least one advantage of the disclosure is that reducing the PAPR at an input of the repeater allows for the optimization of the power efficiency of the power amplifier of the repeater and improves signal to noise ratio of a channel between the repeater and a receiving device.

Figure 7:
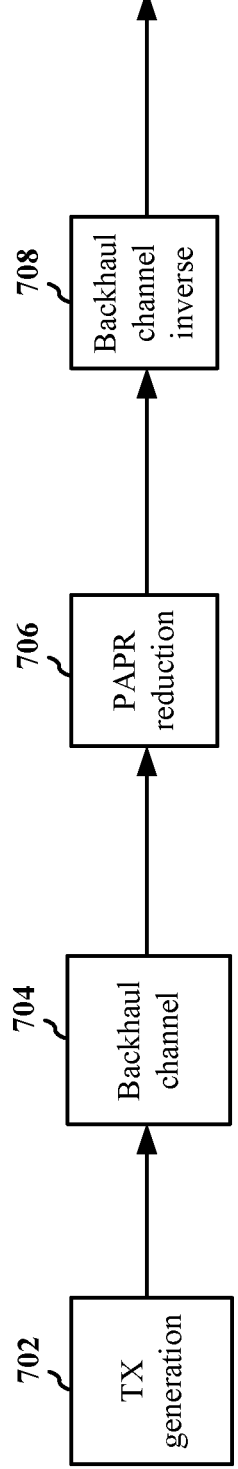
FIG. 7 is a diagram illustrating an example of a reduction of PAPR of a signal.

FIG. 7 is a diagram 700 of a reduction of the dynamic range or the PAPR of the signal in an input of the receiver of the repeater. The diagram 700 includes a TX generation 702, a backhaul channel 704, a PAPR reduction 706 and a backhaul channel inverse 708 The PAPR reduction 706 may utilize any known PAPR reduction methods. In some instances, if a channel is modeled as h[n]=δ[n], which is known as an additive white Gaussian noise channel, then the diagram 700 may be folded to regular existing transmitters. In instances where the transmitter is not power efficient, attention may be placed on the reduction of the receiver's dynamic range. Reducing the dynamic range of the receiver may not result in the dynamic range of the transmitter being smaller or reduced. In some instances, it may be assumed that the transmitter is aware of the channel between the transmitter and the receiver, which may be a valid assumption for a repeater. Reducing the PAPR at the output channel may occur based on the backhaul channel 704 and the backhaul channel inverse 708. If the channel model is known, then a PAPR reduction may be performed to reduce the PAPR at the output of the channel and not at the input of the channel. As such, consideration of the channel may allow for a PAPR reduction to be performed at the input of the receiver. For example, the backhaul channel 704 may model the actual channel, based on the assumption that the transmitter (e.g., TX generation 702) knows the channel. The output of the backhaul channel 704 is inputted to the PAPR reduction 706 to reduce the PAPR. While an output of the PAPR reduction 706 is inputted into the backhaul channel inverse 708 to prepare the signal, having the reduced PAPR, for transmission to the repeater. The backhaul channel inverse 708 applies an inverse of the model of the actual channel applied at backhaul channel 704, which prepares the signal for transmission while having a reduced PAPR at an input of the receiver of the repeater.

The repeater may receive the dynamic range of the signal, from the transmitter, in order for the repeater to have a higher power amplifier power efficiency in the transmitter of the repeater. The base station may provide the dynamic range of the signal to the repeater. The base station may calculate the dynamic range or PAPR of the signal in advance (e.g., one or more slots) and provide the dynamic range of the signal to the controller of the repeater. The dynamic range of the signal may be provided to the repeater within L1 or L2 signaling. If the repeater is self controllable, the dynamic range may be signaled from the transmitter to the repeater within a control channel. If the repeater is controlled by the network, then the network may control the automatic gain control of the transmitter of the repeater by considering the actual (e.g., post-PAPR reduction) dynamic range of the signal at the receiver input.

In some aspects, the data to be transmitted for a specific slot may be known, in advance, by the transmitter. The channel from the transmitter to the relevant repeaters may be known by the transmitter, for instances where the repeater is within a set of linked repeaters. The channel itself may be fed back from any hops (e.g., repeaters) to the main transmitter. The channel may be assumed to be coherent in time for at least the slots. In some aspects, the base station may send a request to each of the hops in the link regarding the capability of supporting dynamic back off signaling. The request may be signaled via MAC-CE or RRC. Each of the hops would signal back to the base station the response of whether or not they support dynamic back off. The response may include at least one of whether the respective repeater supports dynamic back off, how many slots in advance the respective repeater needs to receive the command in order to implement the command or time to adapt the power amplifier's bias or input voltage, or a limit or minimum supported back off. The response may be signaled via MAC-CE or RRC. In some aspects, the base station may determine which KPI to optimize. After the optimization of the one or more KPIs, the transmitter may calculate, in advance, the receiver PAPR for each repeater within the link, which may be done by exploiting the channel knowledge. The main transmitter may translate the calculated receiver PAPR (e.g., at hop n) to the transmitter PAPR for each hop. The transmitter may calculate the power amplifier back off value for each of the repeaters within the link. In some aspects, the base station may signal to each of the hops the updated power amplifier back off. The updated power amplifier back off may be provided via DCI or MAC-CE. In some aspects, one or more of the repeaters may signal back to the base station an actual measured PAPR. The actual measured PAPR may be provided to the base station via MAC-CE.

Figure 8:
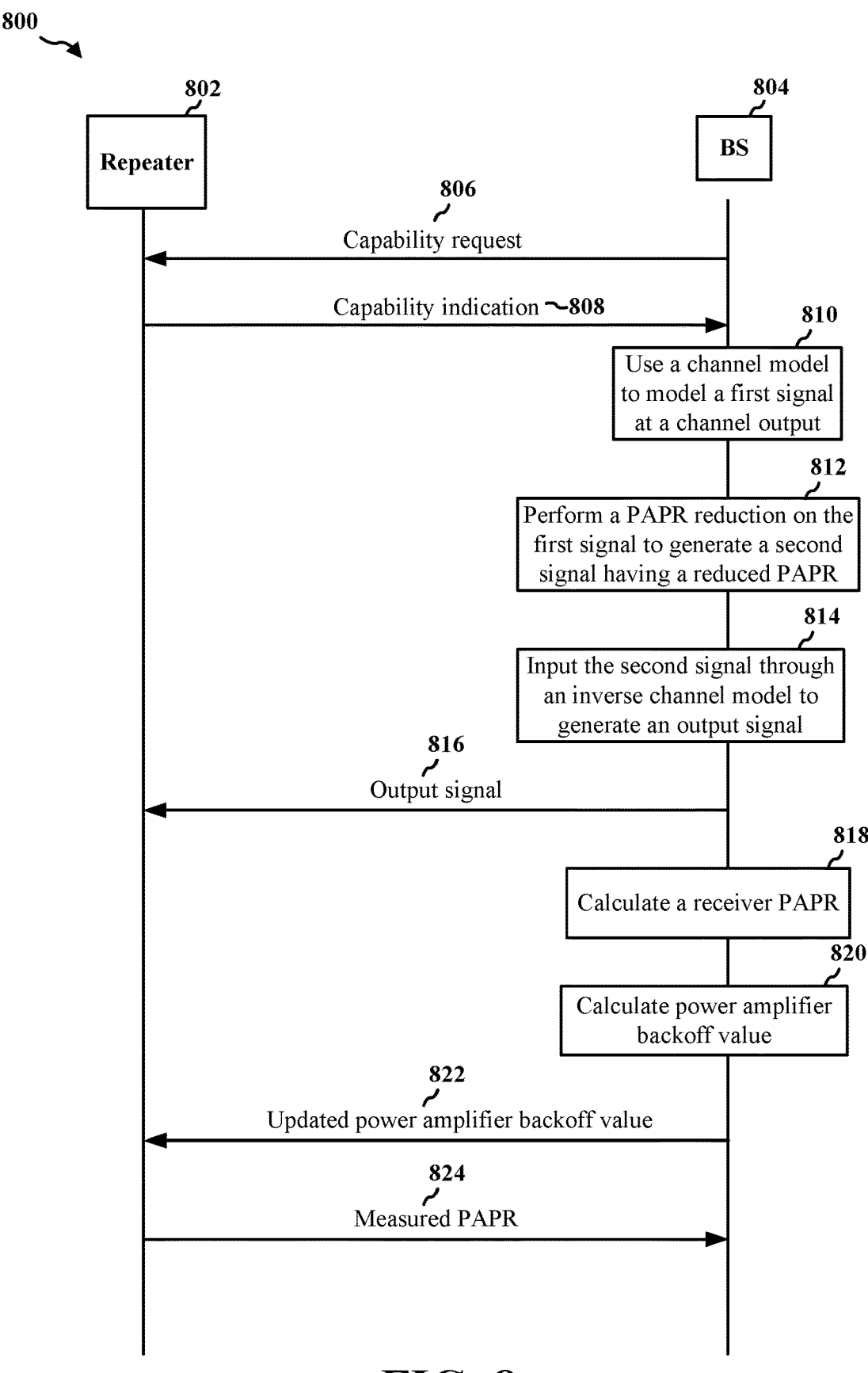
FIG. 8 is a call flow diagram of signaling between a repeater and a base station.

FIG. 8 is a call flow diagram 800 of signaling between a repeater 802 and a base station 804. Although the example aspects are described for a base station 804, one or more of the aspects may be performed by a base station in aggregated form or by a component of a disaggregated base station, such as a CU, DU or RU. The base station 804 may be configured to provide at least one cell. The repeater 802 may be configured to communicate with the base station 804. The repeater 802 may comprise a controller. In some aspects, the controller may comprise a control node or a UE. For example, in the context of FIG. 1, the base station 804 may correspond to base station 102 and/or 310. The base station 804 may further correspond to TX generation 502, 602 and/or 702. Further, the repeater 802 may correspond to repeater 103, 408 510, 608, 612, and/or 616.

At 806, the base station 804 may output a capability request to the repeater 802. The repeater 802 may receive the capability request from the base station 804, e.g., as described in connection with FIG. 6. The base station 804 may output the capability request to determine whether a receiver of the repeater supports a dynamic backoff signal. In some aspects, the capability request may be comprised within at least one of a Layer 2 (L2) or Layer 3 (L3) signaling. For example, the capability request may be within a media access control (MAC) control element (CE) (MAC-CE) or RRC signaling.

At 808, the repeater 802 may transmit a capability indication to the base station 804. The base station 804 may receive the capability indication from the repeater 802. The repeater may transmit the capability indication in response to receipt of the capability request, e.g., as described in connection with FIG. 6. In some aspects, the capability indication may comprise at least one of a dynamic backoff support indication, a timing indication to implement the dynamic backoff signal, or a minimum backoff value supported by the repeater. In some aspects, the capability indication is transmitted via at least one of a L2 or L3 signaling. For example, the capability indication may be transmitted within at least a MAC-CE or RRC signaling.

At 810, the base station 804 may use a channel model to model a first signal at a channel output, e.g., as described in connection with any of the aspects described in connection with FIGS. 4-7. The channel model may model a channel between a receiver and a transmitter. For example, the channel model may model a channel for communication between a receiver at the repeater 802 and a transmitter of the base station 804. In some aspects, the channel model may model a channel between a repeater and a network entity, where the network entity is receiving a transmission from the repeater.

Figure 5:
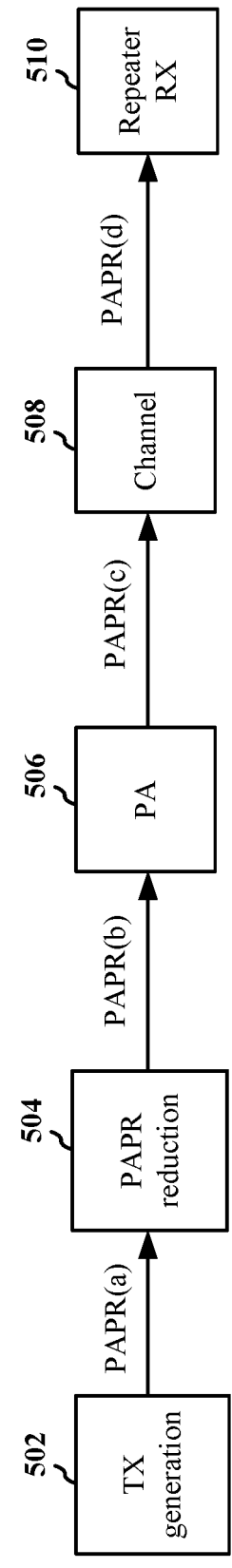
FIG. 5 is a diagram illustrating an example of a reduction of PAPR of a signal.
Figure 6:
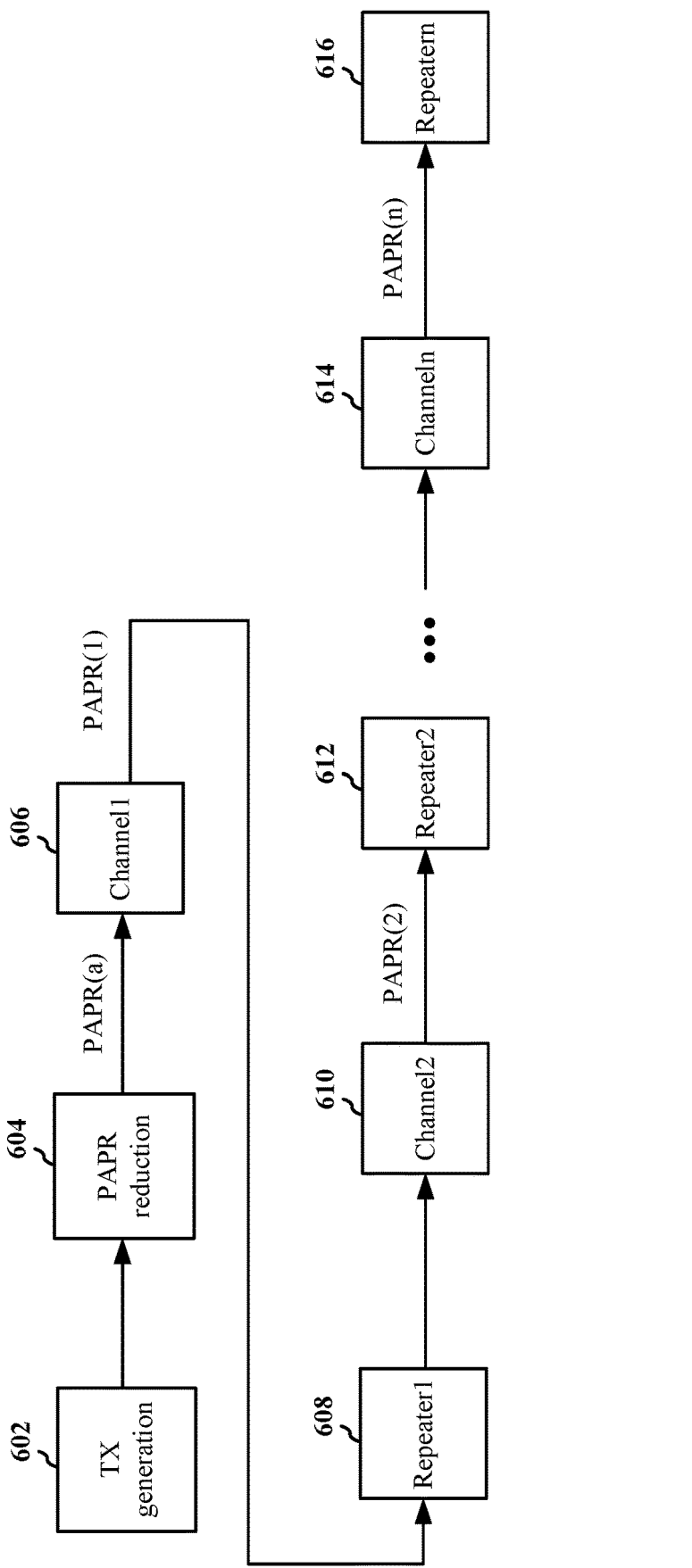
FIG. 6 is a diagram illustrating an example of a reduction of PAPR of a signal for a set of linked repeaters.

At 812, the base station 804 may perform a PAPR reduction on the first signal, e.g., as described in connection with any of the aspects described in connection with FIGS. 5-7. The base station 804 may perform the PAPR reduction on the first signal, modeled using the channel model, at the receiver to generate a second signal having a reduced PAPR.

At 814, the base station 804 may input the second signal through an inverse channel model, e.g., as described in connection with any of the aspects described in connection with FIG. 7. The base station 804 may input the second signal through the inverse channel model to generate an output signal.

At 816, the base station 804 may output the output signal to the receiver of the repeater 802, e.g., as described in connection with any of the aspects described in connection with FIGS. 4-7. The repeater 802 may receive the output signal from the base station 804. The base station 804 may output the output signal to the receiver of the repeater 802, such that the PAPR of the output signal is reduced at an input of the receiver. In some aspects, the receiver of the repeater 802 may be within a set of repeaters (not shown) that form a linked set of repeaters. At least one KPI of one or more repeaters for the linked set of repeaters may be selected for optimization. In some aspects, the at least one KPI may be optimized based at least on a link budget of the one or more repeaters within the linked set of repeaters or a power amplifier efficiency of the one or more repeaters within the linked set of repeaters.

At 818, in instances where the repeater 802 is within a set of repeaters, the base station 804 may calculate a receive PAPR for each repeater, e.g., as described in connection with any of the aspects described in connection with FIG. 6. The base station 804 may calculate a receive PAPR for each repeater within the linked set of repeaters.

At 820, in instances where the repeater 802 is within a set of repeaters, the base station 804 may calculate a power amplifier backoff value for each repeater, e.g., as described in connection with any of the aspects described in connection with FIG. 6. The base station 804 may calculate a power amplifier backoff value for each repeater within the linked set of repeaters based at least on the receive PAPR calculated for each repeater within the linked set of repeaters.

At 822, in instances where the repeater is within a set of repeaters, the base station 804 may output an updated power amplifier backoff value, e.g., as described in connection with any of the aspects described in connection with FIG. 6. The base station 804 may output the updated power amplifier backoff value to at least one repeater within the linked set of repeaters. The repeater 802 may receive the updated power amplifier backoff value from the base station 804. In some aspects, the updated power amplifier backoff value may be comprised within at least one of a L2 or L3 signaling. For example, the updated power amplifier backoff value may be transmitted within a MAC-CE or RRC signaling.

At 824, in instances where the repeater is within a set of repeaters, the base station 804 may obtain a measured PAPR of at least one repeater within the linked set of repeaters, e.g., as described in connection with any of the aspects described in connection with FIG. 6. For example, the repeater 802 may transmit to the base station 804 a measured PAPR. In some aspects, such as where the set of repeaters comprises a plurality of repeaters, the set of repeaters may be linked in series, such that the measured PAPR of a respective repeater is relayed by the remaining set of repeaters that are between the respective repeater and the base station 804. In some aspects, the measured PAPR of the at least one repeater within the linked set of repeaters may be comprised within L2 signaling. For example, the measured PAPR of the at least one repeater within the linked set of repeaters may be within a MAC-CE.

FIG. 9 is a flowchart 900 of a method of wireless communication. The method may be performed by a base station (e.g., the base station 102; the network entity 1102. One or more of the illustrated operations may be omitted, transposed, or contemporaneous. The method may allow a base station to perform PAPR reduction on a modeled channel to improve PAPR at a receiver of a repeater.

At 902, the network entity may use a channel model to model a first signal at a channel output. For example, 902 may be performed by PAPR component 199 of network entity 1102. The channel model may model a channel between a receiver and a transmitter. The repeater may be comprised within a repeater. For example, the channel model may model a channel for communication between a receiver at a repeater and a transmitter of the network entity. In some aspects, the channel model may model a channel between a repeater and a network entity, where the network entity is receiving a transmission from the repeater. Example aspects of the modeling the first signal are described in connection with FIGS. 4-7.

At 904, the network entity may perform a PAPR reduction on the first signal. For example, 904 may be performed by PAPR component 199 of network entity 1102. The network entity may perform the PAPR reduction on the first signal at the receiver to generate a second signal having a reduced PAPR. FIG. 7 illustrates an example of a PAPR reduction of the first signal.

At 906, the network entity may input the second signal through an inverse channel model. For example, 906 may be performed by PAPR component 199 of network entity 1102. The network entity may input the second signal through the inverse channel model to generate an output signal. FIG. 7 illustrates an example of applying the inverse channel model.

At 908, the network entity may output the output signal to the receiver. For example, 908 may be performed by PAPR component 199 of network entity 1102. The network entity may output the output signal to the receiver of the repeater, such that the PAPR of the output signal is reduced at an input of the receiver. In some aspects, the receiver may be within a set of repeaters that form a linked set of repeaters. At least one KPI of one or more repeaters for the linked set of repeaters may be selected for optimization. In some aspects, the at least one KPI may be optimized based at least on a link budget of the one or more repeaters within the linked set of repeaters or a power amplifier efficiency of the one or more repeaters within the linked set of repeaters. FIGS. 4-7 illustrate examples of the output signal being transmitted to a receiver.

Figure 10:
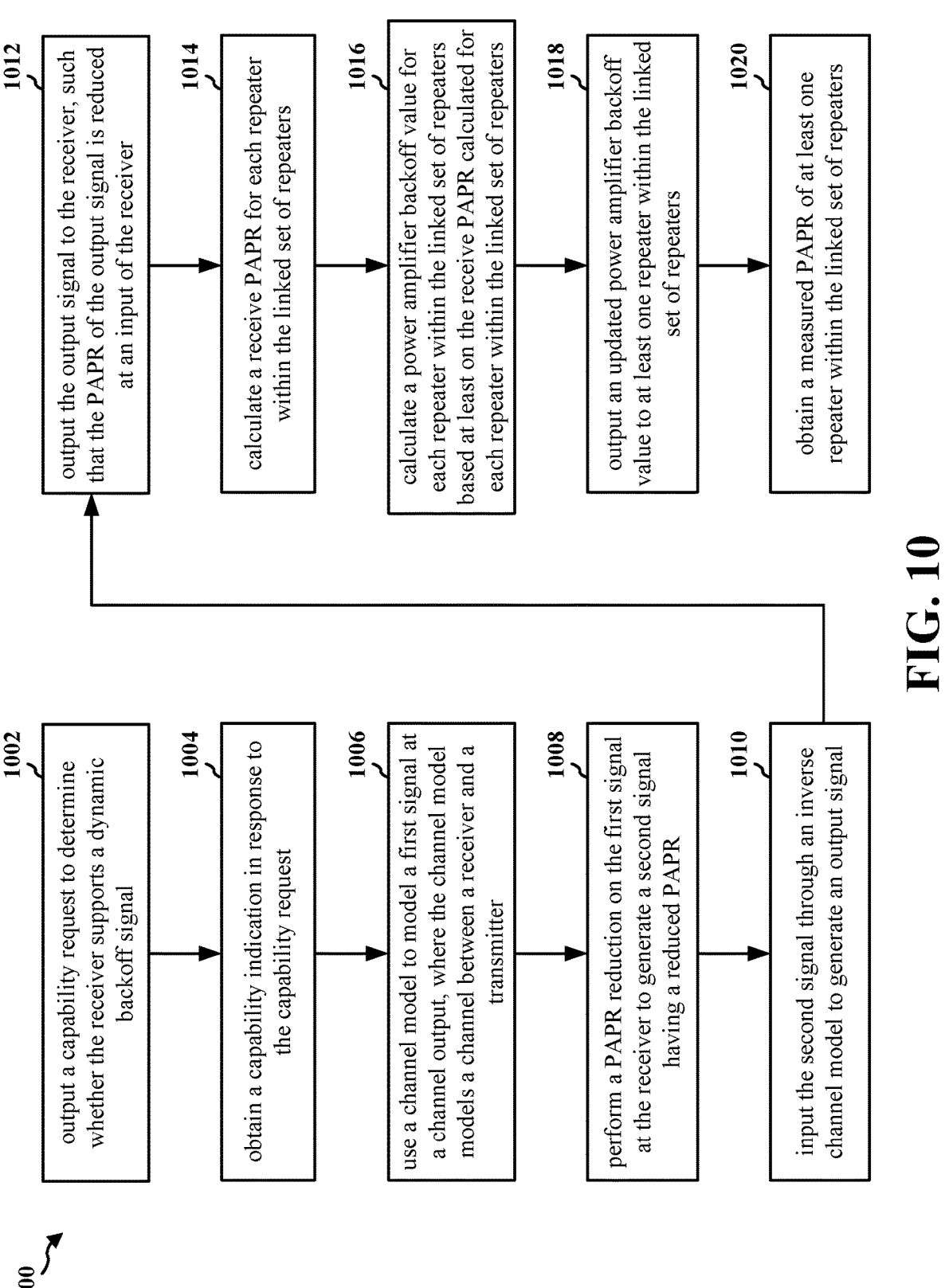
FIG. 10 is a flowchart of a method of wireless communication.

FIG. 10 is a flowchart 1000 of a method of wireless communication. The method may be performed by a base station (e.g., the base station 102; the network entity 1102. One or more of the illustrated operations may be omitted, transposed, or contemporaneous. The method may allow a base station to perform PAPR reduction on a modeled channel to improve PAPR at a receiver of a repeater.

At 1002, the network entity may output a capability request to the repeater. For example, 1002 may be performed by PAPR component 199 of network entity 1102. The network entity may output the capability request to determine whether the receiver of the repeater supports a dynamic backoff signal. In some aspects, the capability request may be comprised within at least one of a L2 or L3 signaling. For example, the capability request may be within a MAC-CE or RRC signaling. Example aspects of transmitting a capability request are described in connection with FIG. 6.

At 1004, the network entity may obtain a capability indication. For example, 1004 may be performed by PAPR component 199 of network entity 1102. The network entity may obtain the capability indication from the repeater. The network entity may obtain the capability indication from the repeater in response to the capability request. In some aspects, the capability indication may comprise at least one of a dynamic backoff support indication, a timing indication to implement the dynamic backoff signal, or a minimum backoff value supported by the receiver of the repeater. The capability indication is comprised within at least one of a L2 or L3 signaling. For example, the capability indication may be received within a MAC-CE or RRC signaling. Example aspects of receiving a capability indication are described in connection with FIG. 6.

At 1006, the network entity may use a channel model to model a first signal at a channel output. For example, 1006 may be performed by PAPR component 199 of network entity 1102. The channel model may model a channel between a receiver and a transmitter. The repeater may be comprised within a repeater. For example, the channel model may model a channel for communication between a receiver at a repeater and a transmitter of the network entity. In some aspects, the channel model may model a channel between a repeater and a network entity, where the network entity is receiving a transmission from the repeater. Example aspects of the modeling the first signal are described in connection with FIGS. 4-7.

At 1008, the network entity may perform a PAPR reduction on the first signal. For example, 1008 may be performed by PAPR component 199 of network entity 1102. The network entity may perform the PAPR reduction on the first signal at the receiver to generate a second signal having a reduced PAPR. FIG. 7 illustrates an example of a PAPR reduction of the first signal.

At 1010, the network entity may input the second signal through an inverse channel model. For example, 1010 may be performed by PAPR component 199 of network entity 1102. The network entity may input the second signal through the inverse channel model to generate an output signal. FIG. 7 illustrates an example of applying the inverse channel model.

At 1012, the network entity may output the output signal to the receiver. For example, 1012 may be performed by PAPR component 199 of network entity 1102. The network entity may output the output signal to the receiver of the repeater, such that the PAPR of the output signal is reduced at an input of the receiver. In some aspects, the receiver may be within a set of repeaters that form a linked set of repeaters. At least one KPI of one or more repeaters for the linked set of repeaters may be selected for optimization. In some aspects, the at least one KPI may be optimized based at least on a link budget of the one or more repeaters within the linked set of repeaters or a power amplifier efficiency of the one or more repeaters within the linked set of repeaters. FIGS. 4-7 illustrate examples of the output signal being transmitted to a receiver.

At 1014, in instances where the repeater is within a set of repeaters, the network entity may calculate a receive PAPR for each repeater. For example, 1014 may be performed by PAPR component 199 of network entity 1102. The network entity may calculate a receive PAPR for each repeater within the linked set of repeaters. FIG. 6 illustrate examples of the calculating a receive PAPR for each repeater.

At 1016, in instances where the repeater is within a set of repeaters, the network entity may calculate a power amplifier backoff value for each repeater. For example, 1016 may be performed by PAPR component 199 of network entity 1102. The network entity may calculate a power amplifier backoff value for each repeater within the linked set of repeaters based at least on the receive PAPR calculated for each repeater within the linked set of repeaters. FIG. 6 illustrate examples of the calculating a power amplifier backoff value for each repeater.

At 1018, in instances where the repeater is within a set of repeaters, the network entity may output an updated power amplifier backoff value. For example, 1018 may be performed by PAPR component 199 of network entity 1102. The network entity may output the updated power amplifier backoff value to at least one repeater within the linked set of repeaters. In some aspects, the updated power amplifier backoff value may be comprised within at least one of a L2 or L3 signaling. For example, the updated power amplifier backoff value may be transmitted within a MAC-CE or RRC signaling. FIG. 6 illustrate examples of providing the updated power amplifier backoff value for each repeater.

At 1020, in instances where the repeater is within a set of repeaters, the network entity may obtain a measured PAPR of at least one repeater within the linked set of repeaters. For example, 1020, may be performed by PAPR component 199 of network entity 1102. In some aspects, the measured PAPR of the at least one repeater within the linked set of repeaters may be comprised within L2 signaling. For example, the measured PAPR of the at least one repeater within the linked set of repeaters may be within a MAC-CE. FIG. 6 illustrate examples of providing the measured PAPR for each repeater to the network entity.

Figure 11:
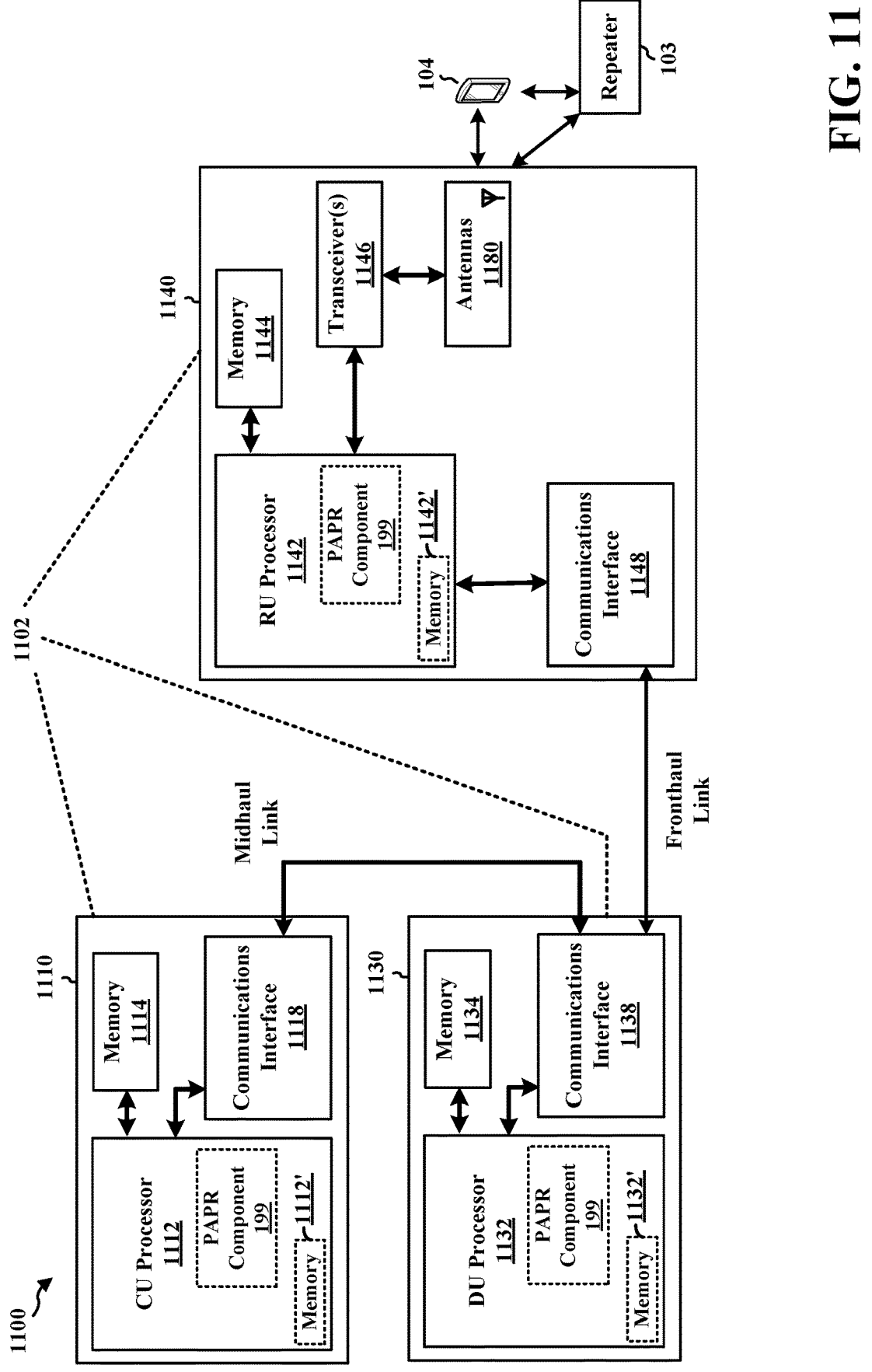
FIG. 11 is a diagram illustrating an example of a hardware implementation for an example network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include a CU processor 1112. The CU processor 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include a DU processor 1132. The DU processor 1132 may include on-chip memory 1132'. In some aspects, the DU 1130 may further include additional memory modules 1134 and a communications interface 1138. The DU 1130 communicates with the RU 1140 through a fronthaul link. The RU 1140 may include an RU processor 1142. The RU processor 1142 may include on-chip memory 1142'. In some aspects, the RU 1140 may further include additional memory modules 1144, one or more transceivers 1146, antennas 1180, and a communications interface 1148. The RU 1140 communicates with the UE 104. In some instances, the RU 1140 communicates with the UE 104 via a repeater 103. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to use a channel model to model a first signal at a channel output, where the channel model models a channel between a receiver and a transmitter; perform a PAPR reduction on the first signal at the receiver to generate a second signal having a reduced PAPR; input the second signal through an inverse channel model to generate an output signal; and outputting the output signal to the receiver, such that the PAPR of the output signal is reduced at an input of the receiver. The component 199 may be within one or more processors of one or more of the CU 1110, DU 1130, and the RU 1140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 includes means for using a channel model to model a first signal at a channel output, where the channel model models a channel between a receiver and a transmitter. The network entity includes means for performing a PAPR reduction on the first signal at the receiver to generate a second signal having a reduced PAPR. The network entity includes means for inputting the second signal through an inverse channel model to generate an output signal. The network entity include means for outputting the output signal to the receiver, such that the PAPR of the output signal is reduced at an input of the receiver. The network entity further includes means for outputting a capability request to determine whether the receiver of a repeater supports a dynamic backoff signal. The capability request is comprised within at least one of L2 or L3 signaling. The network entity further includes means for obtaining a capability indication in response to the capability request. The network entity further includes means for calculating a receive PAPR for each repeater within the linked set of repeaters. The network entity further includes means for calculating a power amplifier backoff value for each repeater within the linked set of repeaters based at least on the receive PAPR calculated for each repeater within the linked set of repeaters. The network entity further includes means for outputting an updated power amplifier backoff value to at least one repeater within the linked set of repeaters. The network entity further includes means for obtaining a measured PAPR of at least one repeater within the linked set of repeaters. The means may be the component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

Figure 12:
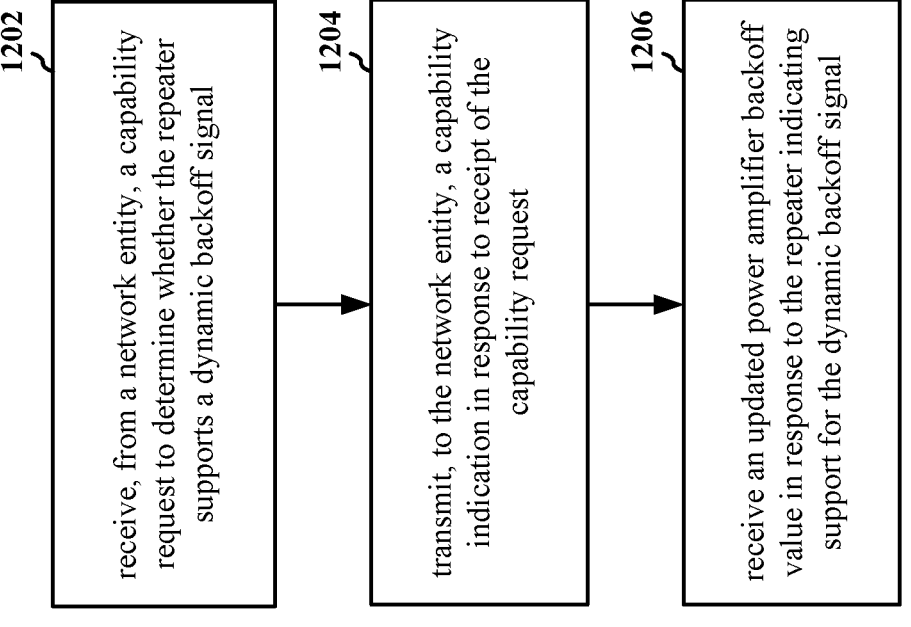
FIG. 12 is a flowchart of a method of wireless communication.

FIG. 12 is a flowchart 1200 of a method of wireless communication. The method may be performed by a repeater comprising a UE (e.g., the repeater 103; the apparatus 1304). One or more of the illustrated operations may be omitted, transposed, or contemporaneous. The method may allow a repeater to improve efficiency of a transmitter of the repeater based on a modeled signal having an improved PAPR at a receiver of a repeater.

At 1202, the repeater may receive a capability request. For example, 1202 may be performed by capability component 198 of apparatus 1304. The repeater may receive the capability request from a network entity. The repeater may receive the capability request to determine whether the repeater supports a dynamic backoff signal. In some aspects, the capability request may be comprised within at least one of a L2 or L3 signaling. For example, the capability request may be within a MAC-CE or RRC signaling. FIG. 6 illustrate examples of receiving a capability request from the network entity.

At 1204, the repeater may transmit a capability indication. For example, 1204 may be performed by capability component 198 of apparatus 1304. The repeater may transmit the capability indication to the network entity. The repeater may transmit the capability indication in response to receipt of the capability request. In some aspects, the capability indication may comprise at least one of a dynamic backoff support indication, a timing indication to implement the dynamic backoff signal, or a minimum backoff value supported by the repeater. In some aspects, the capability indication is transmitted via at least one of a L2 or L3 signaling. For example, the capability indication may be transmitted within at least a MAC-CE or RRC signaling. FIG. 6 illustrate examples of transmitting a capability indication in response to receiving a capability request from the network entity.

At 1206, the repeater may receive an updated power amplifier backoff value. For example, 1206 may be performed by capability component 198 of apparatus 1304. The repeater may receive the updated power amplifier backoff value from the network entity. The repeater may receive the updated power amplifier backoff value in response to the repeater indicating support for the dynamic backoff signal. In some aspects, the repeater may be within a set of repeaters that form a linked set of repeaters. At least one key performance indicator (KPI) of one or more repeaters for the linked set of repeaters may be configurable. The at least one KPI may be optimized based at least on a link budget of the one or more repeaters within the linked set of repeaters, or a power amplifier efficiency of the one or more repeaters within the linked set of repeaters. FIG. 6 illustrate examples of receiving an updated power amplifier backoff value from the network entity.

Figure 13:
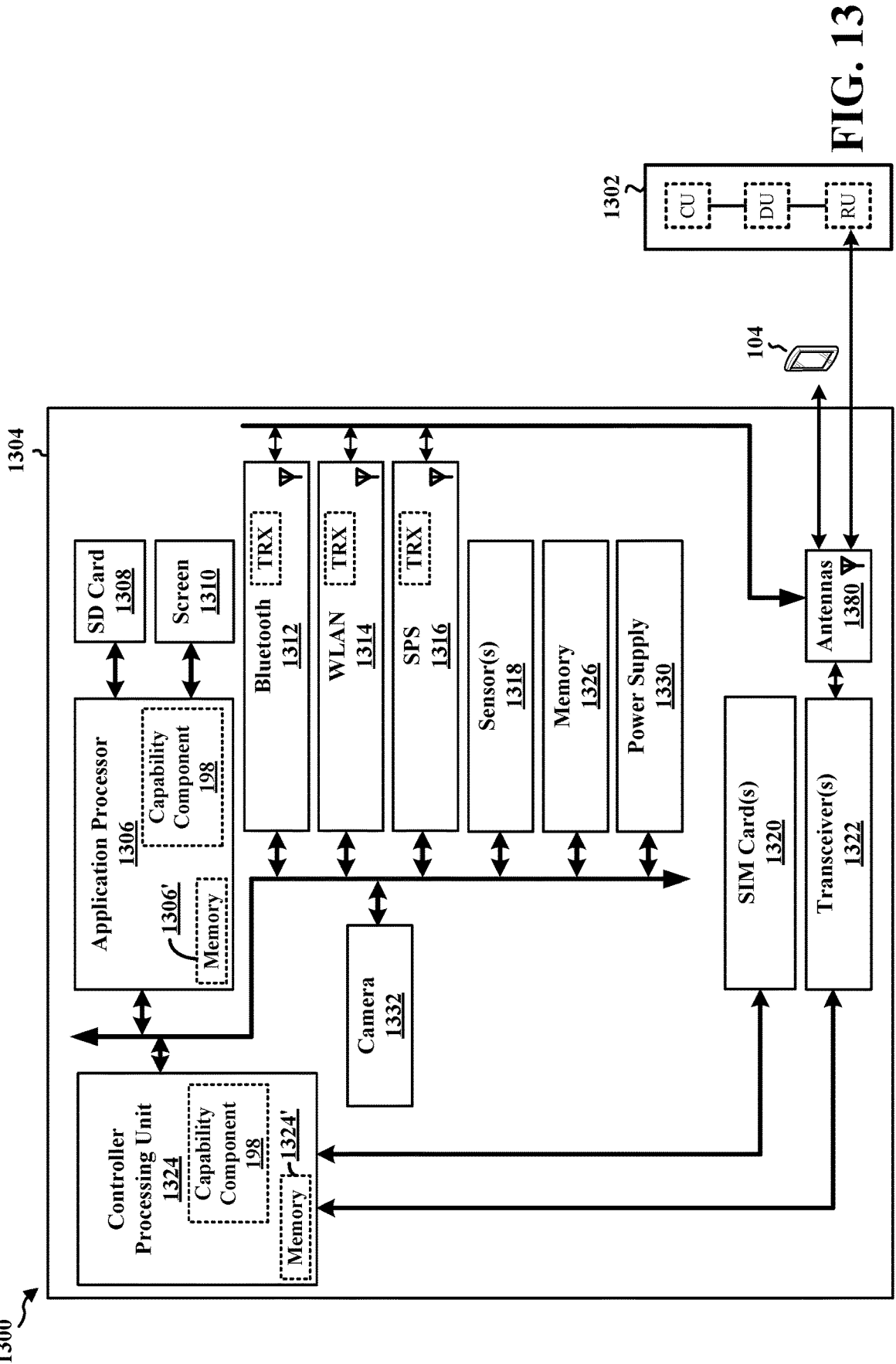
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a repeater comprising a UE, a component of a UE, or may implement UE functionality. In some aspects, the apparatus 1304 may include a controller processing unit 1324 (also referred to as a modem) coupled to one or more transceivers 1322 (e.g., cellular RF transceiver). The controller processing unit 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The controller processing unit 1324 communicates through the transceiver(s) 1322 via one or more antennas 1380 with the UE 104 and/or with an RU associated with a network entity 1302. The controller processing unit 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The controller processing unit 1324 and the application processor 1306 are each responsible for general processing, including the execution of software stored on the computer-readable medium/memory. The software, when executed by the controller processing unit 1324/application processor 1306, causes the controller processing unit 1324/application processor 1306 to perform the various functions described supra. The computer-readable medium/memory may also be used for storing data that is manipulated by the controller processing unit 1324/application processor 1306 when executing software. The controller processing unit 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the controller processing unit 1324 and/or the application processor 1306, and in another configuration, the apparatus 1304 may be the entire UE (e.g., see 350 of FIG. 3) and include the additional modules of the apparatus 1304.

As discussed supra, the component 198 is configured to receive, from a network entity, a capability request to determine whether the repeater supports a dynamic backoff signal; transmit, to the network entity, a capability indication in response to receipt of the capability request; and receive an updated power amplifier backoff value in response to the repeater indicating support for the dynamic backoff signal. The component 198 may be within the controller processing unit 1324, the application processor 1306, or both the controller processing unit 1324 and the application processor 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the controller processing unit 1324 and/or the application processor 1306, includes means for receiving, from a network entity, a capability request to determine whether the repeater supports a dynamic backoff signal. The apparatus includes means for transmitting, to the network entity, a capability indication in response to receipt of the capability request. The apparatus includes means for receiving an updated power amplifier backoff value in response to the repeater indicating support for the dynamic backoff signal. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network entity, comprising using a channel model to model a first signal at a channel output, where the channel model models a channel between a receiver and a transmitter; performing a PAPR reduction on the first signal at the receiver to generate a second signal having a reduced PAPR; inputting the second signal through an inverse channel model to generate an output signal; and outputting the output signal to the receiver, such that the PAPR of the output signal is reduced at an input of the receiver.

Aspect 2 is the method of aspect 1, further including that the receiver is comprised within a repeater.

Aspect 3 is the method of any of aspects 1 and 2, further including outputting a capability request to determine whether the receiver of a repeater supports a dynamic backoff signal, wherein the capability request is comprised within at least one of L2 or L3 signaling.

Aspect 4 is the method of any of aspects 1-3, further including obtaining a capability indication in response to the capability request.

Aspect 5 is the method of any of aspects 1-4, further includes that the capability indication comprises at least one of a dynamic backoff support indication, a timing indication to implement the dynamic backoff signal, or a minimum backoff value supported by the receiver of the repeater.

Aspect 6 is the method of any of aspects 1-5, further includes that the capability indication is comprised within at least one of L2 or L3 signaling.

Aspect 7 is the method of any of aspects 1-6, further includes that the receiver is within a set of repeaters that form a linked set of repeaters, wherein at least one KPI of one or more repeaters for the linked set of repeaters is selected for optimization.

Aspect 8 is the method of any of aspects 1-7, further includes that the at least one KPI is optimized based at least on a link budget of the one or more repeaters within the linked set of repeaters, or a power amplifier efficiency of the one or more repeaters within the linked set of repeaters.

Aspect 9 is the method of any of aspects 1-8, further including calculating a receive PAPR for each repeater within the linked set of repeaters; and calculating a power amplifier backoff value for each repeater within the linked set of repeaters based at least on the receive PAPR calculated for each repeater within the linked set of repeaters.

Aspect 10 is the method of any of aspects 1-9, further including outputting an updated power amplifier backoff value to at least one repeater within the linked set of repeaters.

Aspect 11 is the method of any of aspects 1-10, further includes that the updated power amplifier backoff value is comprised within at least one of L2 or L3 signaling.

Aspect 12 is the method of any of aspects 1-11, further including obtaining a measured PAPR of at least one repeater within the linked set of repeaters.

Aspect 13 is the method of any of aspects 1-12, further includes that the measured PAPR of the at least one repeater within the linked set of repeaters is comprised within L2 signaling.

Aspect 14 is an apparatus for wireless communication at a network entity including at least one processor coupled to a memory and at least one transceiver, the at least one processor configured to implement any of Aspects 1-13.

Aspect 15 is an apparatus for wireless communication at a network entity including means for implementing any of Aspects 1-13.

Aspect 16 is a computer-readable medium storing computer executable code, where the code when executed by a processor causes the processor to implement any of Aspects 1-13.

Aspect 17 is a method of wireless communication at a repeater comprising receiving, from a network entity, a capability request to determine whether the repeater supports a dynamic backoff signal; transmitting, to the network entity, a capability indication in response to receipt of the capability request; and receiving an updated power amplifier backoff value in response to the repeater indicating support for the dynamic backoff signal.

Aspect 18 is the method of aspect 17, further includes that the capability request or the updated power amplifier backoff value is comprised within at least one of L2 or L3 signaling.

Aspect 19 is the method of any of aspects 17 and 18, further includes that the capability indication comprises at least one of a dynamic backoff support indication, a timing indication to implement the dynamic backoff signal, or a minimum backoff value supported by the repeater.

Aspect 20 is the method of any of aspects 17-19, further includes that the capability indication is transmitted via at least one of L2 or L3 signaling.

Aspect 21 is the method of any of aspects 17-20, further includes that the repeater is within a set of repeaters that form a linked set of repeaters, wherein at least one KPI of one or more repeaters for the linked set of repeaters is configurable.

Aspect 22 is the method of any of aspects 17-21, further includes that the at least one KPI is optimized based at least on a link budget of the one or more repeaters within the linked set of repeaters, or a power amplifier efficiency of the one or more repeaters within the linked set of repeaters.

Aspect 23 is an apparatus for wireless communication at a repeater including at least one processor coupled to a memory and at least one transceiver, the at least one processor configured to implement any of Aspects 17-23.

Aspect 24 is an apparatus for wireless communication at a repeater including means for implementing any of Aspects 17-23.

Aspect 25 is a computer-readable medium storing computer executable code, where the code when executed by a processor causes the processor to implement any of Aspects 17-23.

What is claimed is:

1. An apparatus for wireless communication at a network entity, comprising:

a memory; and at least one processor coupled to the memory and, based at least in part on information stored in the memory, the at least one processor is configured to:

use a channel model to model a first signal at a channel output, where the channel model models a channel between a receiver and a transmitter;

perform a peak to average power ratio (PAPR) reduction on the first signal at the receiver to generate a second signal having a reduced PAPR;

input the second signal through an inverse channel model to generate an output signal; and output the output signal to the receiver, such that the PAPR of the output signal is reduced at an input of the receiver.

2. The apparatus of claim 1, further comprising a transceiver coupled to the at least one processor.

3. The apparatus of claim 1, wherein the receiver is comprised within a repeater.

4. The apparatus of claim 1, wherein the at least one processor is configured to:

output a capability request to determine whether the receiver of a repeater supports a dynamic backoff signal, wherein the capability request is comprised within at least one of Layer 2 (L2) or Layer 3 (L3) signaling.

5. The apparatus of claim 4, wherein the at least one processor is configured to:

obtain a capability indication in response to the capability request.

6. The apparatus of claim 5, wherein the capability indication comprises at least one of a dynamic backoff support indication, a timing indication to implement the dynamic backoff signal, or a minimum backoff value supported by the receiver of the repeater.

7. The apparatus of claim 5, wherein the capability indication is comprised within at least one of the Layer 2 (L2) or Layer 3 (L3) signaling.

8. The apparatus of claim 1, wherein the receiver is within a set of repeaters that form a linked set of repeaters, wherein at least one key performance indicator (KPI) of one or more repeaters for the linked set of repeaters is selected for optimization.

9. The apparatus of claim 8, wherein the at least one KPI is optimized based at least on a link budget of the one or more repeaters within the linked set of repeaters, or a power amplifier efficiency of the one or more repeaters within the linked set of repeaters.

10. The apparatus of claim 8, wherein the at least one processor is configured to:

calculate a receive PAPR for each repeater within the linked set of repeaters; and calculate a power amplifier backoff value for each repeater within the linked set of repeaters based at least on the receive PAPR calculated for each repeater within the linked set of repeaters.

11. The apparatus of claim 10, wherein the at least one processor is configured to:

output an updated power amplifier backoff value to at least one repeater within the linked set of repeaters.

12. The apparatus of claim 11, wherein the updated power amplifier backoff value is comprised within at least one of Layer 2 (L2) or Layer 3 (L3) signaling.

13. The apparatus of claim 10, wherein the at least one processor is configured to:

obtain a measured PAPR of at least one repeater within the linked set of repeaters.

14. The apparatus of claim 13, wherein the measured PAPR of the at least one repeater within the linked set of repeaters is comprised within Layer 2 (L2) signaling.

15. A method of wireless communication at a network entity, comprising:

using a channel model to model a first signal at a channel output, where the channel model models a channel between a receiver and a transmitter;

performing a peak to average power ratio (PAPR) reduction on the first signal at the receiver to generate a second signal having a reduced PAPR;

inputting the second signal through an inverse channel model to generate an output signal; and outputting the output signal to the receiver, such that the PAPR of the output signal is reduced at an input of the receiver.

16. The method of claim 15, further comprising:

outputting a capability request to determine whether the receiver of a repeater supports a dynamic backoff signal, wherein the capability request is comprised within at least one of Layer 2 (L2) or Layer 3 (L3) signaling.

17. The method of claim 16, further comprising:

obtaining a capability indication in response to the capability request.

18. The method of claim 17, wherein the capability indication comprises at least one of a dynamic backoff support indication, a timing indication to implement the dynamic backoff signal, or a minimum backoff value supported by the receiver of the repeater.

19. The method of claim 15, wherein the receiver is within a set of repeaters that form a linked set of repeaters, wherein at least one key performance indicator (KPI) of one or more repeaters for the linked set of repeaters is selected for optimization.

* * * * *